(12) United States Patent
Sparschuh

(10) Patent No.: US 8,511,334 B2
(45) Date of Patent: Aug. 20, 2013

(54) COMPRESSED GAS SYSTEM, MANUAL VALVE ASSEMBLY, AND MANUAL VALVE PISTON WITH ISOCHORIC THERMAL ISOLATION ZONE

(75) Inventor: Jens-Uwe Sparschuh, Nackenheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 252 days.

(21) Appl. No.: 12/902,267

(22) Filed: Oct. 12, 2010

(65) Prior Publication Data
US 2012/0085464 A1 Apr. 12, 2012

(51) Int. Cl.
*F16K 47/00* (2006.01)

(52) U.S. Cl.
USPC ............ 137/340; 251/214; 251/144; 251/903

(58) Field of Classification Search
USPC ............... 251/48, 50–54, 120, 122, 123, 144, 251/174, 190, 193, 194, 207, 214, 264, 265, 251/269, 273, 274, 318, 324, 325, 330, 340, 251/903, 319; 137/265, 340, 583, 584
See application file for complete search history.

(56) References Cited

U.S. PATENT DOCUMENTS

| | | | | |
|---|---|---|---|---|
| 3,152,786 A | * | 10/1964 | Soderberg et al. | 251/167 |
| 4,114,851 A | * | 9/1978 | Shivak et al. | 251/88 |
| 4,964,432 A | * | 10/1990 | Chou | 137/15.24 |
| 5,048,565 A | * | 9/1991 | Oi | 137/614.19 |
| 5,341,844 A | * | 8/1994 | Wass et al. | 137/613 |
| 5,474,104 A | * | 12/1995 | Borland et al. | 137/381 |
| 5,511,576 A | * | 4/1996 | Borland | 137/72 |
| 5,562,117 A | * | 10/1996 | Borland et al. | 137/74 |
| 5,632,297 A | * | 5/1997 | Sciullo et al. | 137/73 |
| 5,785,082 A | * | 7/1998 | Geis et al. | 137/516.29 |
| 2006/0266973 A1 | * | 11/2006 | Gladwell | 251/324 |
| 2007/0290158 A1 | * | 12/2007 | Lancaster | 251/214 |
| 2008/0105309 A1 | * | 5/2008 | Kuroyanagi et al. | 137/505.41 |
| 2009/0146094 A1 | * | 6/2009 | Suzuki et al. | 251/324 |

* cited by examiner

*Primary Examiner* — Eric Keasel
*Assistant Examiner* — Matthew W Jellett
(74) *Attorney, Agent, or Firm* — Dinsmore & Shohl LLP

(57) ABSTRACT

Manual-valve pistons, manual-valve assemblies comprising the manual-valve pistons, and compressed-gas systems comprising the manual-valve-assemblies are disclosed. A manual-valve piston for sealing a compressed-gas conduit may comprise a head portion, a sealing portion, and a stem portion between the head portion and the sealing portion. When the manual-valve piston in a conduit, a gap is defined between a blocking rim of the head portion that allows compressed gas to be trapped in an isochoric thermal isolation zone adjacent to the stem portion. The isochoric thermal isolation zone protects sealing rings seated in the sealing portion from extremely cold compressed gas being introduced into the compressed-gas system. Manual-valve assemblies comprise a manual-valve piston coupled to a coupling body. Compressed-gas systems comprise a fuel-storage vessel, a refueling port, internal conduits, and a manual-valve assembly disposed in one of the internal conduits.

7 Claims, 4 Drawing Sheets

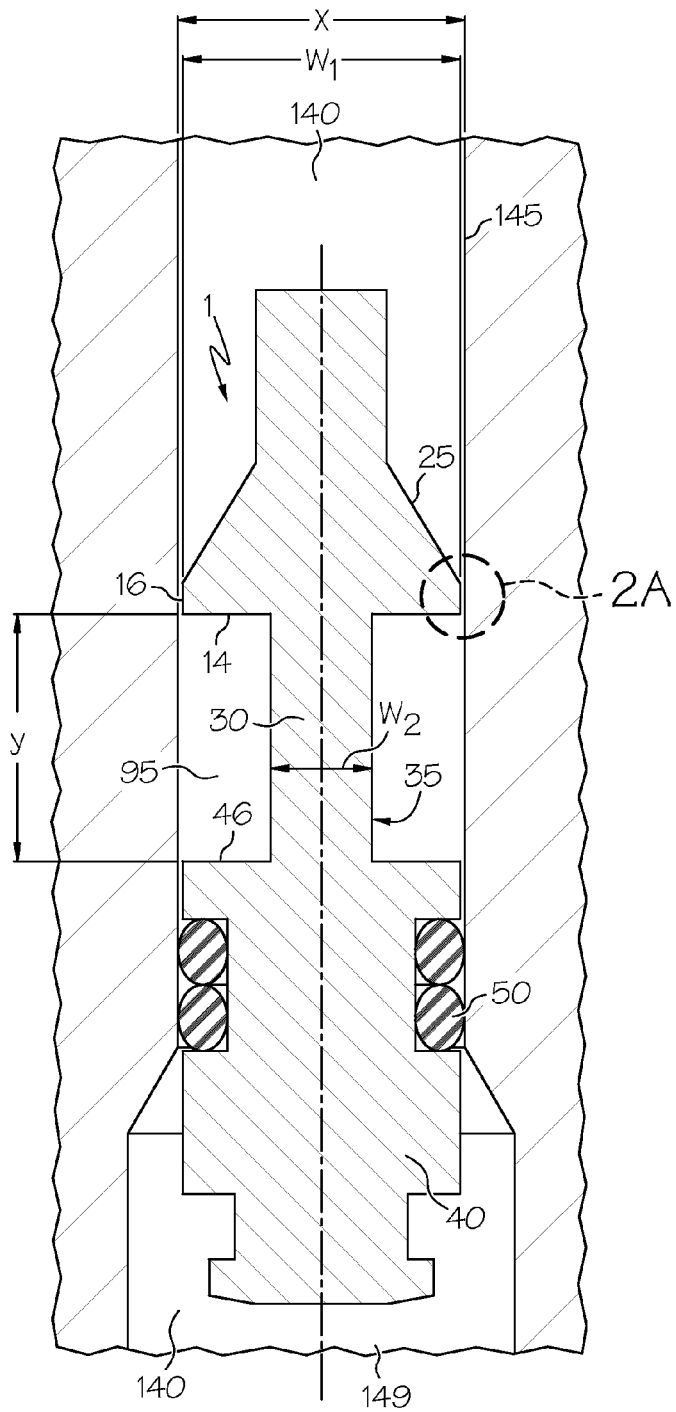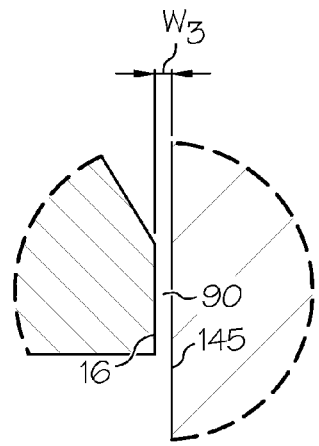
FIG. 2
FIG. 2A

COMPRESSED GAS SYSTEM, MANUAL VALVE ASSEMBLY, AND MANUAL VALVE PISTON WITH ISOCHORIC THERMAL ISOLATION ZONE

TECHNICAL FIELD

This invention relates generally to compressed gas systems. In particular, this invention relates to manual valve assemblies for the compressed gas systems, and to manual valve pistons for the manual valve assemblies.

BACKGROUND

Compressed gas systems may be found in numerous applications. For example, alternate-fuel powered vehicles typically comprise a compressed gas system for storing compressed gasses and providing the compressed gasses to an engine or fuel cell as sources of motive energy. Examples of compressed gasses used in alternate-fuel powered vehicles include, but are not limited to, compressed natural gas (CNG) and hydrogen.

Vehicular compressed gas systems generally comprise one or more seals between components of the system. Examples of such seals include not only welds and other permanent component connections, but also sealing rings such as o-rings. When o-rings are made from plastics or rubbers, for example, repeated heating and cooling, exposure to sharp pressure differences, and general brittleness at low temperatures may decrease durability of the o-rings and effectiveness of their sealing properties. Thus, reliability of the compressed gas systems as a whole depends in part on the sealing effectiveness of the sealing rings, as well as on the ability of the sealing rings to withstand severe conditions such as high pressures, large and sometimes fast changes in pressure, high and low temperatures, and fast changes in temperature. As such, challenges for optimization of compressed gas systems includes providing components and configuring the systems to minimize exposure of the seals to severe conditions tending to decrease effectiveness or lifetime of the seals.

Public infrastructures for supplying compressed gasses to compressed gas systems in alternate-fuel powered vehicles typically deliver the compressed gases at reduced temperatures such as, for example, −40° C. As such, the compressed gas systems may be subjected to significant thermal shock during refueling operations. In hot-weather environments where ambient temperatures may exceed +40° C., the thermal shock may be a result of a large temperature difference between the cold, incoming compressed gas and the ambient environment. In cold-weather environments where temperatures may be as low as −40° C. already, the starting of the vehicle may involve an initial sharp rise in pressure of the system when sealing components in the system already may be stressed by the low ambient temperature. Therefore, ongoing needs remain for developing compressed gas system components that increase reliability and durability of the seals in the compressed gas systems.

SUMMARY

These and other needs are addressed by the features detailed in the example embodiments described herein.

In one embodiment, a manual-valve piston comprises a head portion, a stem portion, and a sealing portion. The head portion comprises a top end, a bottom surface, and a blocking rim. The blocking rim is defined on an outer surface of the head portion between the top end and the bottom surface. The stem portion is interposed between the head portion and the sealing portion, such that the stem portion is connected to a top surface of the sealing portion and to the bottom surface of the head portion. The stem portion has a stem-portion width less than the blocking-rim width. The sealing portion has a sealing-ring groove defined in an outer surface thereof for accommodating at least one sealing ring.

The manual-valve piston may be used for sealing a compressed-gas conduit defined by a conduit wall and having a conduit inside diameter. The width of the blocking rim of the manual-valve piston is less than the conduit inside diameter. The manual-valve piston is insertable head portion first into the compressed-gas conduit through a conduit opening, such that when the manual-valve piston is fully inserted into the compressed-gas conduit and at least one sealing ring is seated within the sealing ring groove, (1) a rim gap is defined between the blocking rim of the head portion and the conduit wall; (2) an isochoric thermal isolation zone is defined in the compressed-gas conduit between the bottom surface of the head portion and the top surface of the sealing portion radially outwardly from the stem portion; and (3) the at least one sealing ring substantially prevents fluid communication between the isochoric thermal isolation zone and the conduit opening.

In another embodiment, a manual-valve assembly comprises a manual-valve piston and a coupling body coupled to the manual-valve piston. The coupling body may comprise coupling body threads for engaging corresponding threads defined in the conduit wall. The coupling body may be a single part or two parts. The coupling body may comprise a tool port for manipulating the manual-valve assembly into or out of a compressed-gas conduit.

In still another embodiment, a compressed-gas system comprises a fuel-storage vessel, a refueling port, a joint conduit, a compressed-gas conduit, and a manual-valve assembly according to one or more embodiments described herein. The joint conduit is in fluid communication with at least one of the refueling port and the fuel storage vessel. The compressed-gas conduit is in fluid communication with the joint conduit. The compressed-gas conduit has a conduit inside diameter and is defined by a conduit wall, which may comprise conduit mechanical threads. The compressed-gas conduit comprises a conduit opening to an ambient-pressure external environment.

These and other features, aspects, and advantages of the present invention will become better understood with reference to the following description, appended claims, and accompanying drawings.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings, in which:

FIG. 2 is a cross-sectional view of the manual-valve piston shown in FIG. 1 when the manual-valve piston is fully inserted into a compressed gas conduit;

FIG. 2A is an inset view showing a rim gap defined between a blocking rim and a conduit wall;

DETAILED DESCRIPTION

Figure 1:
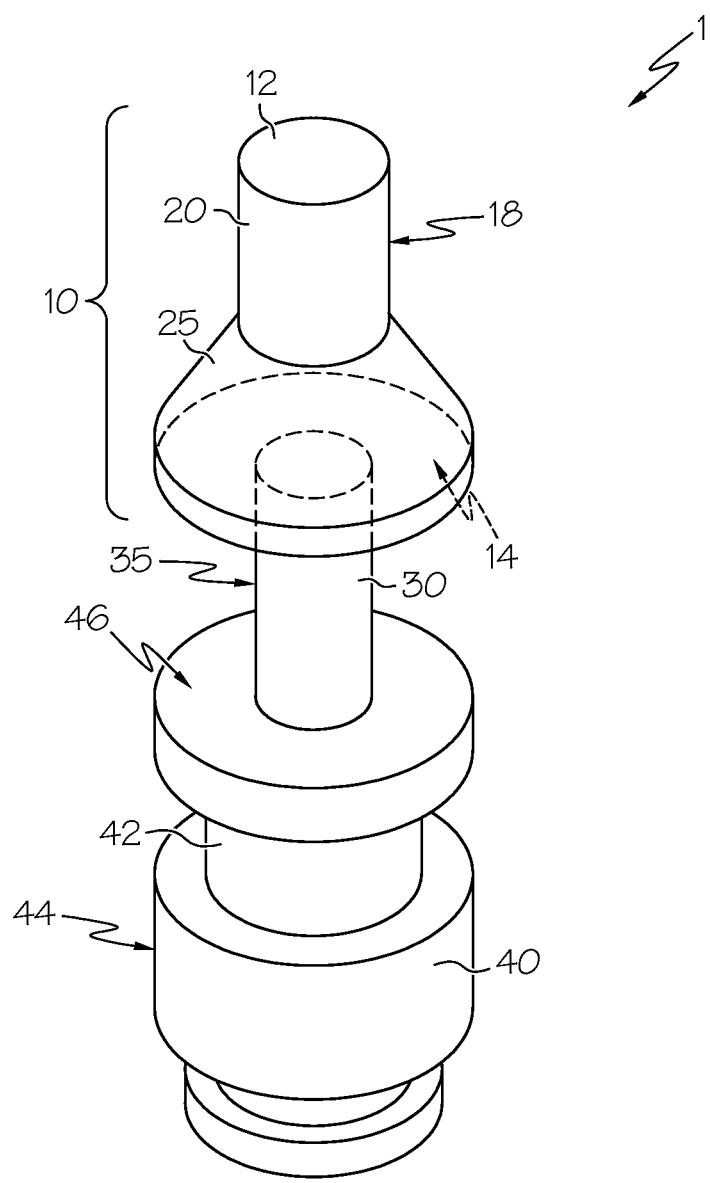
FIG. 1 is a perspective view of a manual-valve piston according to one or more example embodiment described herein.

Though the following detailed description refers occasionally to specific embodiments, it is to be understood that the specific embodiments are non-limiting examples only. The specific embodiments are provided so that this disclosure will be thorough and complete and will fully elucidate and clarify all aspects of the claims to those skilled in the art.

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

Unless otherwise indicated, all numbers expressing quantities or measurements used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. One of ordinary skill in the art will understand that any numerical values inherently contain certain errors attributable to the measurement techniques used to ascertain the values.

Unless otherwise noted, when a first measurement herein is provided as a specified percentage of a specified second measurement, it will be understood that the first measurement is equal to the specified second measurement times the specified percentage, divided by 100. For example, if a first measurement is described as 80% of a second measurement, and the second measurement is 100 m, the first measurement has been described thereby as 100 m×80/100=80 m. When ranges are provided for either the specified percentage or the specified second measurement, the first measurement shall be understood to encompass the broadest possible range derivable from the specified values. For example, if a first measurement is specified as "from 80% to 90%" of a second measurement, and the second measurement is specified as "from 50 m to 100 m," the first measurement has been described thereby as from 40 m (80% of 50 m) to 90 m (90% of 100 m), with the understanding that the original limitation "from 80% to 90%" necessarily still applies to the relative values of the first measurement and the second measurement. As such, in the above scenario, the first measurement cannot be 50 m if the second measurement is 100 m. Here, even though the first measurement would be within the range of 40 m to 90 m and the second measurement would be within the range of 50 m to 100 m, the 50 m first measurement is not within the range of from 80% to 90% of the 100 m second measurement.

Referring to FIG. 1, an example embodiment of a manual-valve piston 1 is shown. The manual-valve piston 1 comprises a head portion 10, a stem portion 30, and a sealing portion 40. The head portion 10 comprises a top end 12, a head-portion bottom surface 14, and a blocking rim 16. The blocking rim 16 is defined on a head-portion outer surface 18 between the top end 12 and the head-portion bottom surface 14. The blocking rim 16 has a blocking-rim width $w_1$. The manual-valve piston 1 may be constructed from any suitable material having rigidity and having compatibility with compressed gasses such as CNG or hydrogen. Examples of materials well-suited for the manual-valve piston include, but are not limited to: austenitic steels such as, for example, those according to DIN specifications 1.3952, 1.4433, 1.4435, 1.4438, or 1.4439, without regard to temperature limitations; austenitic steels according to DIN specifications 1.4306, 1.4401, 1.4404, 1.4406; 1.4429, 1.4430, 1.4434, 1.4571, having temperature limitations of from −100° C. to +200° C.; aluminum; aluminum alloys such as, for example, EN AW-5042, EN AW-5049, EN AW-5083, EN AW-5754, EN AW-6060, EN AW-6061 or EN AW-6082; and polyether ether ketone (PEEK).

The stem portion 30 of the manual-valve piston 1 is interposed between the head portion 10 and the sealing portion 40, such that the stem portion 30 is connected to a sealing-portion top surface 46 of the sealing portion 40 and to the head-portion bottom surface 14. The stem portion 30 has a stem-portion width $w_2$ less than the blocking-rim width $w_1$. The sealing portion 40 has a sealing-ring groove 42 for accommodating at least one sealing ring (not shown). The sealing-ring groove 42 is defined in a sealing-portion outer surface 44 of the sealing portion 40.

In preferred embodiments, as shown in FIG. 1, the head portion 10 may comprise a head-portion flare 25 adjacent to the head-portion bottom surface 14. The head portion 10 further may comprise a head-portion cap 20 adjacent to the top end 12. The head-portion cap 20 may be substantially cylindrical and have a head-portion cap width less than the blocking-rim width $w_1$. The head-portion flare 25 may have a substantially trapezoidal cross-section, such that the width of the head-portion flare 25 increases from the head-portion cap width to the blocking-rim width $w_1$ in the direction along the head-portion outer surface 18 toward the head-portion bottom surface 14. The precise contour of the head portion 10, including the presence or absence of a head-portion cap 20, a head-portion flare 25, or both, are not critical. Even so, when present, the head-portion flare 25 may impart beneficial flow characteristics to a compressed-gas system, described below, such as by influencing flow patterns into an isochoric thermal isolation zone, also described below.

Referring to FIGS. 1 and 2, the manual-valve piston 1 may be used to seal a compressed-gas conduit 140 defined by a conduit wall 145 and having a conduit inside diameter x. Particularly, the manual-valve piston 1 may be inserted, with the head portion 10 first, into the compressed-gas conduit 140 through a conduit opening 149. When the manual-valve piston 1 is to be fully inserted into the compressed-gas conduit 140, preferably at least one sealing ring 50 is seated in the sealing-ring groove 42 of the sealing portion 40. As used herein, the term "fully inserted" means that the manual-valve piston 1 is inserted into the compressed-gas conduit 140 to the extent that at least all of the sealing-ring groove 42, including the at least one sealing ring 50 seated in the sealing-ring groove 42, is disposed within the compressed-gas conduit 140.

The at least one sealing ring 50 may comprise any material suitable for sealing high-pressure systems with exposure to temperatures in the range of about −45° C. to about +40° C. When more than one sealing ring is present, each sealing ring may be made from the same material or from different materials. More than one sealing ring may be used, for example, to provide a second "back-up" sealing ring as a failsafe mechanism behind a first sealing ring. Preferably, each sealing ring is chemically compatible with a desired compressed gas such as CNG or hydrogen, for example. Materials may be chosen based on their TR10 value (i.e., the temperature at which the material exhibits a 10% compression set) in view of expected temperature specifications for a compressed gas system into which the manual-valve piston 1 is to be incorporated. The at least one sealing ring 50 may be a simple o-ring or may have any desired contour. It will be understood, however, that more complicated sealing ring structures may require additional machining of the conduit to be sealed by the at least one sealing ring 50. Materials such as polyurethane (PU) may be advantageous because polyurethanes have a desirably low TR10 value and, as such, would be expected to have higher durability at low temperatures such as down to −50° C. Even so, polyurethane materials an be considerably more costly than alternate, elastic materials such as ethylene propylene diene monomer (EPDM), fluoroelastomers (FKM), and nitrile butadiene rubber (NBR), hydrogenated nitrile butadiene rubber (HNBR), isobutylene isoprene rubber (IIR), and chlorobutyl rubber (CIIR), for example. Elastic materials such as these typically can withstand temperatures down to about −40° C.

When the manual-valve piston 1 is fully inserted into the compressed gas conduit 140 and at least one sealing ring 50 is seated within said sealing-ring groove 42, a rim gap 90 is defined between the blocking rim 16 and the conduit wall 145. The rim gap 90 is illustrated further in the inset view of FIG. 2A. Additionally, an isochoric thermal isolation zone 95 is defined in the compressed gas conduit 140 between the head-portion bottom surface 14 and the sealing-portion top surface 46, radially outwardly from the stem-portion outer surface 35. The at least one sealing ring 50 substantially prevents fluid communication between the isochoric thermal isolation zone 95 and the conduit opening 149. As used herein, the recitation "substantially prevents fluid communication" means that, under normal and intended use, all fluid communication is prevented. Nevertheless, it is fully contemplated that under some circumstances, a negligible or very small amount of unintended fluid communication may be present, such as around a non-optimal sealing ring or via a diffusion phenomenon.

As shown in FIGS. 2 and 2A, a rim-gap width $w_3$ of the rim gap 90 is defined by the blocking-rim width $w_1$ of the blocking rim 16. In general, the blocking-rim width $w_1$ is less than the conduit inside diameter x. Preferably, the blocking-rim width $w_1$ is less than the conduit inside diameter x and also at least 80%, at least 90%, at least 95%, at least 99%, at least 99.9%, or even at least 99.99% of the conduit inside diameter x. Alternatively, the blocking-rim width $w_1$ may be from 80% to 99.99%, from 90% to 99.9%, from 95% to 99.9%, or from 99% to 99.99% of the conduit inside diameter x. As an illustrative, non-limiting example, if the conduit inside diameter x is about 1 cm (10 mm) and the blocking-rim width $w_1$ is from about 80% to about 99.9% of the conduit inside diameter x, the resulting width of the rim gap 90 would be from about 0.01 mm to about 2 mm. It will be appreciated that the compressed-gas conduit 140 need not have a uniform conduit inside diameter x throughout its entire depth. As such, expression of the blocking-rim width $w_1$ as a fraction of the conduit inside diameter x will be understood to refer to the conduit inside diameter x at a cross section of the compressed-gas conduit 140 that includes the head-portion bottom surface 14 of the manual-valve piston 1 when the manual-valve piston 1 is fully inserted into the compressed-gas conduit.

As noted above, the stem-portion width $w_2$ is less than the blocking-rim width $w_1$. In preferred embodiments, the stem-portion width $w_2$ is from about 10% to about 70%, from about 20% to about 60%, from about 30% to about 50%, or from about 30% to about 40% of the blocking-rim width $w_1$. Generally, the stem-portion width $w_2$ may be chosen to be sufficiently large to provide adequate strength to the stem portion 30 without concern that the stem portion 30 can bend or break when the manual-valve piston 1 is repeatedly inserted into or removed from the compressed-gas conduit 140. On the other hand, the stem-portion width $w_2$ may be chosen to be sufficiently small as to maximize the volume of the isochoric thermal isolation zone 95, provided the stem portion 30 retains adequate strength to resist bending or breaking. In addition to advantages that will be described in detail below with respect to an isochoric thermal isolation zone, the presence of a stem portion 30 narrower than other parts of the manual-valve piston 1 advantageously decreases the weight and material cost of the manual-valve piston 1 over the cost of a similar piston having a substantially uniform width throughout its entire length.

A stem-portion lengthy of the stem portion 30, as measured from the head-portion bottom surface 14 to the sealing-portion top surface 46, may be chosen so as to optimize the thermal characteristics of the isochoric thermal isolation zone 95. In particular, the isochoric thermal isolation zone 95 may be tailored in this manner according to the material or materials intended to be used for the at least one sealing ring 50. In example embodiments, the stem-portion lengthy may be chosen with relation to the blocking-rim width $w_1$. For example, the ratio $y/w_1$ may be from about 0.4 to about 1.5, from about 0.5 to about 1.3, from about 0.75 to about 1.2, preferably from about 0.75 to about 1.0. In preferred embodiments, the stem-portion lengthy may be chosen with relation to the difference $w_1-w_2$ between the blocking-rim width $w_1$ and the stem-portion width $w_2$. For example, the ratio $y/(w_1-w_2)$ may be from about 0.75 to about 2.0, from about 1.0 to about 2.0, preferably from about 1.0 to about 1.5, most preferably from about 1.2 to about 1.3.

Figure 3:
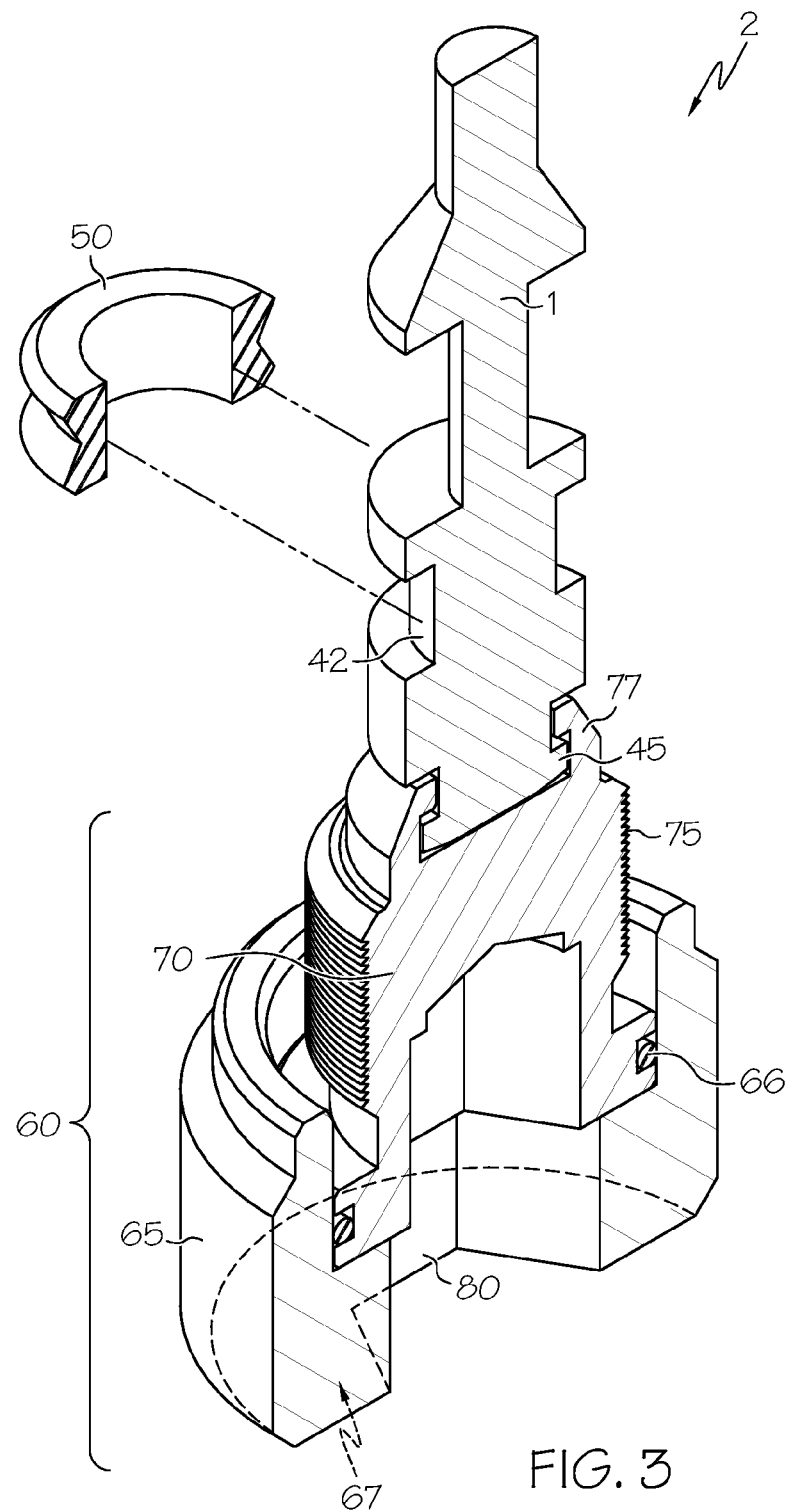
FIG. 3 is a perspective view with cross-section of a manual-valve assembly comprising a manual-valve piston, according to one or more example embodiment described herein.

Referring now to FIG. 3, in further embodiments, the manual-valve piston 1 may be incorporated as a component of a manual-valve assembly 2. The manual-valve assembly 2 comprises a manual-valve piston 1 and a coupling body 60 coupled to the manual-valve piston 1. In the manual-valve assembly 2, the manual-valve piston 1 may comprise any or all of the features described above with reference to FIGS. 1 and 2. In FIG. 3, the sealing-ring groove 42 is shown as accommodating the at least one sealing ring 50.

In the manual-valve assembly 2, the manual-valve piston 1 and the coupling body 60 may be formed together as an integral component or may be separate components. When the manual-valve piston 1 and the coupling body 60 are formed as multiple components, for example, the coupling body 60 may comprise a grasping member 77 that engages a support groove 45 defined in the sealing-portion outer surface 44 (see FIG. 1) of the manual-valve piston 1. Likewise, the coupling body 60 may be formed as a single component or as multiple components. For example, the coupling body 60 may comprise an insertion portion 70 and an access portion 65. In such a configuration of the coupling body 60, the insertion portion 70 may be sealed against the access portion 65 by a coupling body seal 66.

The coupling body 60 may comprise a tool port 80 disposed on a bottom end 67 of the coupling body 60. If the coupling body 60 is formed as multiple components, preferably the tool port 80 extends through at least a portion of each of the multiple components, such that a single tool can be inserted into the tool port and used to rotate, grasp, insert, tighten, loosen, remove, or otherwise manipulate the manual-valve assembly 2. Though the tool port 80 shown in FIG. 3 is a female-type port requiring an insertable tool such as, for example, a hex key (as shown), a similarly insertable wrench having any desired geometric shape known or to be invented, a screwdriver, or a customized insertable tool, it will be readily understood that the tool port 80 may be configured alternatively as a protruding member (not shown) for manipulation or grasping by a tool such as a socket, a wrench, or pliers, and still retain the same purpose and function.

In preferred embodiments, the coupling body 60 may comprise coupling-body threads 75 for engaging corresponding mechanical threads defined in a threaded portion of the conduit wall. When the coupling body 60 is formed of multiple components, the coupling-body threads 75 may be disposed on the insertion portion 70 of the coupling body 60. When coupling-body threads 75 are present, preferably the grasping member 77 and the support groove 45 are configured so that the coupling body 60 may be rotated freely about the longitudinal axis of the manual-valve assembly without forcing the manual-valve piston 1 to rotate at the same time. In such a configuration, the manual-valve assembly 2 may be inserted and secured into a compressed-gas conduit having a conduit wall with a threaded portion by rotating the manual-valve assembly by hand or with a tool in cooperation with the tool port 80. If the coupling body 60 rotates freely without forcing the manual-valve piston 1 to rotate simultaneously, the manual-valve piston is simply driven into the compressed-gas conduit without being rotated. Thereby, frictional wear of the at least one sealing ring 50 attributable to rubbing of the at least one sealing ring 50 against the conduit wall during rotation may be minimized or eliminated. When the coupling body 60 comprises both a tool port 80, described above, and coupling-body threads 75, the tool port 80 is mechanically coupled to the coupling-body threads 75, such that rotation of a tool engaged with the tool port 80 causes rotation of the coupling-body threads 75. For example, the manual-valve assembly 2 disposed in a compressed-gas conduit 140 may be removed from the compressed-gas conduit 140 by engaging a tool with the tool port 80 and rotating the tool in a decompressive direction.

Figure 4:
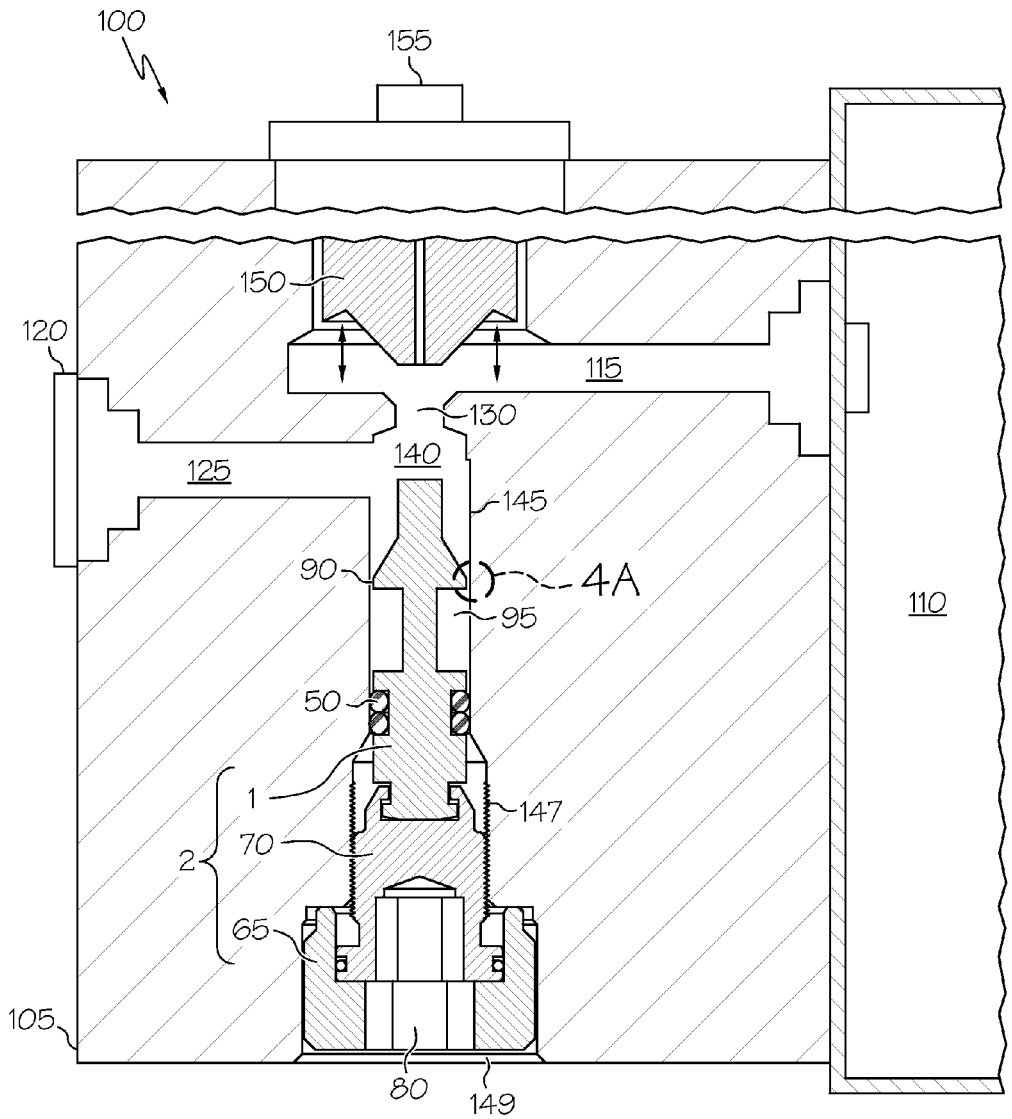
FIG. 4 is a cross-sectional and schematic view of a compressed-gas system comprising a manual-valve assembly, according to one or more example embodiment described herein.

Referring now to FIG. 4, the manual-valve assembly 2 described above may be incorporated into a compressed-gas system 100. The compressed-gas system 100 may comprise a fuel-storage vessel 110, a refueling port 120, a joint conduit 130, a compressed-gas conduit 140, and a manual-valve assembly 2. The compressed-gas conduit 140 is in fluid communication with the joint conduit 130. The joint conduit 130 may be in fluid communication with at least one of the refueling port 120 and the fuel-storage vessel 110. For example, the joint conduit 130 may be in fluid communication with the refueling port 120 by way of a refueling conduit 125. Likewise, the joint conduit 130 may be in fluid communication with the fuel-storage vessel 110, for example, by way of a vessel conduit 115. One or more components of the compressed-gas system 100 may be disposed within a valve box 105. The valve box 105 may be mounted by any practical means directly to the fuel-storage vessel 110 or may be spatially separated from the fuel-storage vessel 110, provided in the latter case that fluid communication is established between the fuel-storage vessel 110 and the vessel conduit 115.

Optionally, the refueling conduit 125, the vessel conduit 115, or both, may include one or more flow manipulation devices or actuators (not shown) for starting fluid flow, stopping fluid flow, or changing an amount of fluid flow. For example, as shown in FIG. 4, the vessel conduit 115 may include an automatic valve 150 operable to stop or start fluid communication between the fuel-storage vessel 110 and the joint conduit 130, for example, by being moved in or out of the joint conduit 130 in response to signals from various control apparatus (not shown) or to one or more predetermined physical or thermal conditions. An end of the automatic valve 150 is shown in FIG. 4 as part of a larger structure that may be made to move up or down in the direction of the arrows. As illustrated schematically, the larger structure of which the automatic valve 150 is an end part may comprise a connection port 155 for placing the automatic valve 150 in fluidic communication with one or more devices (not shown) such as, for example a fuel cell, an injection system, a reformer, or a combustion engine.

Referring still to FIG. 4, the compressed-gas conduit 140 is defined by a conduit wall 145. At least a portion of the conduit wall 145 may comprise conduit threads 147 or a similar feature for securing the manual-valve assembly 2 within the compressed-gas conduit 140. The compressed-gas conduit 140 comprises a conduit opening 149 to the outside of the valve box 105. Thus, when the manual-valve assembly 2 is fully inserted into the compressed-gas conduit, the tool port 80 remains exposed to enable a technician to remove the manual-valve assembly 2 by inserting an appropriate tool into the tool port 80 and rotating the manual-valve assembly 2 against the conduit threads 147 on the conduit wall 145. In particular, the conduit threads 147 engage the coupling-body threads 75 (see FIG. 3) so as to define both an insertion direction of rotation and a removal direction of rotation for the manual-valve assembly 2, depending on the orientation of the conduit threads 147.

In the compressed-gas system 100 shown in FIG. 4, the manual-valve assembly 2 may be removed, for example, to service the compressed-gas system 100 as a whole or components such as the fuel-storage vessel 110. Particularly when the automatic valve 150 is controlled by electronic means such as a battery-driven control apparatus, the automatic valve 150 may fail to close or may be deactivated when the battery is disconnected. As such, the manual-valve assembly 2 may find utility as a pressure relief device for permitting servicing of the compressed-gas system when the automatic valve 150 is inoperable.

Figure 4A:
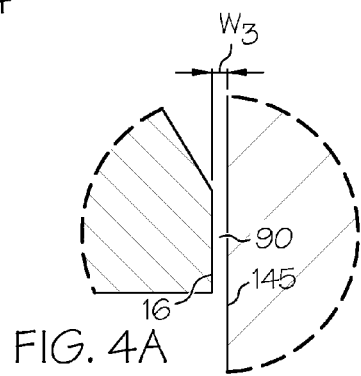
FIG. 4A is an inset view showing from FIG. 4 the rim gap defined between the blocking rim and the conduit wall.

As described above with reference to FIG. 2, the compressed-gas conduit 140 has a conduit inside diameter x. As shown in FIGS. 4 and 4A, in the compressed-gas system 100, the blocking rim 16 of the manual-valve piston 1 of the manual-valve assembly 2 has a blocking-rim width $w_1$ less than said conduit inside diameter, so as to define a rim gap 90 with a rim-gap width $w_3$ between the blocking rim 16 and the conduit wall 145. The rim gap 90 typically is quite narrow and need only be sufficiently wide to allow passage of a measurable amount of compressed gas from the joint conduit 130 into the isochoric thermal isolation zone 95. For example, the blocking-rim width $w_1$ may be less than the conduit inside diameter x and also at least 80%, at least 90%, at least 95%, at least 99%, or even at least 99.9% of the conduit inside diameter x. Alternatively, the blocking-rim width $w_1$ may be from 80% to 99.9%, from 90% to 99.9%, from 95% to 99.9%, or from 99% to 99.9% of the conduit inside diameter x. Thus, the rim gap 90 functions in this regard not as an open fluid passageway but, rather, as an orifice leading from the joint conduit 130 to the isochoric thermal isolation zone 95 and permitting a minimal amount of fluid communication between the isochoric thermal isolation zone 95 and the joint conduit 130.

Also described above with reference to FIG. 2, the stem portion 30 of the manual-valve piston 1 of the manual-valve assembly 2 has a stem-portion width $w_2$ less than the blocking-rim width $w_1$. In preferred embodiments, the stem-portion width $w_2$ is from about 10% to about 70%, from about 20% to about 60%, from about 30% to about 50%, or from about 30% to about 40% of the blocking-rim width $w_1$. Thereby, an isochoric thermal isolation zone 95 is defined in the compressed gas conduit 140 between the head-portion bottom surface 14 and the sealing-portion top surface 46, radially outwardly from the stem-portion outer surface 35. The at least one sealing ring 50 substantially prevents fluid communication between the isochoric thermal isolation zone 95 and the conduit opening 149 and, as such, prevents leakage of compressed gas from the compressed-gas system 100 to the external environment. Without intent to be limited by theory, it is believed that a narrow blocking-rim width $w_1$ may additionally prevent damage to the at least one sealing ring 50 from sudden increases of pressure in the compressed-gas system 100 that arise at the beginning of refueling and vehicle starting operations.

With respect to the isochoric thermal isolation zone 95, the term "isochoric" is used according to the common meaning of "having a constant volume." The isochoric thermal isolation zone 95 in general functions as a thermal buffer between the joint conduit 130 and the at least one sealing ring 50, especially when extremely cold compressed gas is introduced into the joint conduit 130 from either the refueling conduit 125 or the vessel conduit 115. This thermal buffering effect of the isochoric thermal isolation zone 95 may be further advantageous, because economical sealing ring materials having lower cold tolerance may be used in the place of more expensive materials having higher cold tolerance. Without intent to be limited by any particular theory of operation, the function of the isochoric thermal isolation zone 95 is best understood in view of temperatures and pressures present in various portions of the compressed-gas system 100 during refueling and vehicle starting operations.

Within the compressed-gas system 100, the refueling conduit 125 is at a refueling conduit pressure $P_1$, the fuel-storage vessel 110 is at a vessel pressure $P_2$, and the isochoric thermal isolation zone 95 is at an isolation zone pressure $P_3$. When no compressed gas is present in the compressed-gas system 100, $P_1=P_2=P_3$, and each pressure is approximately atmospheric pressure (about 1 atm). The temperature of the compressed-gas system 100 is approximately equal to the ambient temperature of the environment outside the valve box 105.

During a refueling operation, a compressed gas such as compressed natural gas or hydrogen may be introduced into the compressed-gas system 100 through the refueling port 120 and the refueling conduit 125. The compressed gas may have a temperature of −40° C. or lower on entry into the refueling conduit 125 and may be introduced at pressures in excess of 800 atmospheres (atm). To permit compressed gas to enter the fuel-storage vessel 110 during refueling, the automatic valve 150 is forced into an open position, as depicted in FIG. 4. Initially, the refueling conduit pressure $P_1$ is significantly higher than the vessel pressure $P_2$ and the isolation zone pressure $P_3$. As such, compressed gas begins to flow into the fuel-storage vessel 110 through the vessel conduit 115 and also into the isochoric thermal isolation zone 95 through the rim gap 90. Most of the compressed gas being introduced into the refueling conduit 125 continues to flow into the fuel-storage vessel 110, where it begins to fill the fuel-storage vessel 110 and become compressed.

Though the temperature of the compressed gas in the fuel-storage vessel 110 begins to rise as the fuel-storage vessel 110 is filled, the compressed gas flowing through the joint conduit 130 remains at substantially the same temperature during refueling (i.e., as low as −40° C.), owing to the presence of pressure drops in the conduits, such as may be caused near edges, seals, and small orifices connected to components not shown in FIG. 4. Thus, if no isochoric thermal isolation zone 95 were present, the at least one sealing ring 50 could be constantly exposed to very low temperatures during refueling, possibly shortening the life of the at least one sealing ring 50. But because the isochoric thermal isolation zone 95 has a constant volume without any pressure drops, the isolation zone pressure $P_3$ may equilibrate to the refueling conduit pressure $P_1$ at about the same rate as the vessel pressure $P_2$ increases to the refueling conduit pressure $P_1$ when being filled with the compressed gas.

Choice of a very narrow blocking gap width $w_3$ further ensures that the compressed gas flows substantially in one direction, into the isochoric thermal isolation zone 95, and not back out into the joint conduit 130. Thus, the isochoric thermal isolation zone 95 is essentially a stagnant dead zone without recirculation of the compressed gas. Choice of a very narrow blocking gap width $w_3$ also ensures that the increase of the isolation zone pressure $P_3$ occurs relatively slowly. The expected rise in temperature within the constant volume of the isochoric thermal isolation zone 95, therefore, may be counterbalanced by the colder temperature of the compressed gas entering the isochoric thermal isolation zone 95. Thermal simulations of the isochoric thermal isolation zone 95 performed on a system similar to the compressed-gas system 100 shown in FIG. 4 indicated that during a refueling operation the temperature of the isochoric thermal isolation zone 95 initially rose slightly but thereafter remained substantially constant. Importantly, the substantially constant temperature in the isochoric thermal isolation zone 95 during refueling indicated that the at least one sealing ring was protected from constant exposure to very cold compressed gas entering the compressed-gas system 100.

During a vehicle starting operation, the isochoric thermal isolation zone 95 functions in a similar manner to protect the at least one sealing ring from thermal shock. In the compressed-gas system 100 immediately prior to a vehicle starting operation, the refueling port 120 is sealed and the automatic valve is in a closed position (down in FIG. 4) preventing fluid communication between the vessel conduit 115 and the joint conduit 130. The refueling conduit pressure $P_1$ and the isolation zone pressure $P_3$ at the beginning of the vehicle starting operation are substantially lower pressure than the vessel pressure $P_2$. When the vehicle is started, the automatic valve 150 is raised into the position shown in FIG. 4 to establish fluid communication between the fuel-storage vessel 110 and the connection port 155 and, more particularly, between the fuel-storage vessel 110 and any device (not shown) such as a fuel cell or a combustion engine in fluid communication with the connection port 155.

As is evident from FIG. 4, the opening of the automatic valve 150 exposes the joint conduit 130 to high-pressure expanding compressed gas from the fuel-storage vessel 110. The expansion of compressed gas from the fuel-storage vessel 110 naturally results in a drop in temperature of the compressed gas. Particularly when the ambient temperature is very low, for example below −30° C., further decrease of the compressed gas temperature during a vehicle starting operation can affect the at least one sealing ring 50 in the absence of an isochoric thermal isolation zone 95 in exactly the same manner as can cold gas entering the refueling conduit 125 during a refueling operation. However, during a vehicle starting operation the configuration of the isochoric thermal isolation zone 95 allows the isolation zone pressure $P_3$ to increase slowly to the vessel pressure $P_2$. The increase in the isolation zone pressure $P_3$ produces an increase of the temperature in the isolation zone that counterbalances the decreasing temperature of the compressed gas expanding from the fuel-storage vessel 110. Like with the refueling operation, the temperature of the isochoric thermal isolation zone remains substantially constant during the vehicle starting operation, thereby protecting the at least one sealing ring 50 from exceedingly low temperatures and also thereby prolonging the life of the at least one sealing ring 50.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A compressed-gas system comprising a fuel storage vessel, a refueling port, a joint conduit, a compressed-gas conduit, and a manual-valve assembly, wherein:
    said joint conduit is in fluid communication with at least one of said refueling port and said fuel storage vessel;
    said compressed-gas conduit is in fluid communication with said joint conduit;
    said compressed-gas conduit has a conduit inside diameter and is defined by a conduit wall;
    said compressed-gas conduit comprises a conduit opening to an ambient-pressure external environment;
    said manual-valve assembly comprises:
        a manual-valve piston having a head portion, a stem portion, a sealing portion, and at least one sealing ring, wherein:
            said head portion comprises a top end, a bottom surface, and a blocking rim, said blocking rim defined on an outer surface of said head portion between said top end and said bottom surface;
            said blocking rim has a blocking-rim width less than said conduit inside diameter;
            said stem portion is interposed between said head portion and said sealing portion, such that said stem portion is connected to a top surface of said sealing portion and to said bottom surface of said head portion;
            said stem portion has a stem-portion width less than said blocking-rim width; and
            said sealing portion has a sealing ring groove defined in an outer surface thereof; and
        a coupling body coupled to said manual-valve piston;
    said at least one sealing ring is seated in said sealing ring groove of said manual-valve piston; and
    said manual-valve assembly is disposed within said compressed-gas conduit, such that:
        a rim gap is defined between said blocking rim of said head portion and said conduit wall;
        an isochoric thermal isolation zone having a constant volume without any pressure drops is defined in said compressed gas conduit between said bottom surface of said head portion and said top surface of said sealing portion radially outwardly from said stem portion to said conduit wall;
        said at least one sealing ring prevents fluid communication between said isochoric thermal isolation zone and said conduit opening;
        compressed gas enters said isochoric thermal isolation zone through said rim gap during a refueling operation or a starting operation and stagnates in said isochoric thermal isolation zone; and
        during said refueling operation or said starting operation, said isochoric thermal isolation zone thermally buffers said at least one sealing ring from cold compressed gas flowing through said joint conduit.

2. The compressed-gas system of claim 1, wherein:
    said conduit wall comprises conduit threads;
    said coupling body comprises coupling-body threads; and
    said coupling-body threads engage said conduit threads.

3. The compressed-gas system of claim 1, wherein said at least one sealing ring comprises at least one polyurethane sealing ring.

4. The compressed-gas system of claim 1, wherein said at least one sealing ring comprises at least two sealing rings, each sealing ring formed of a material independently selected from the group consisting of ethylene propylene diene monomer, fluoroelastomer, nitrile butadiene rubber, and polyurethane.

5. The compressed-gas system of claim 1, wherein said head portion further comprises a head-portion flare adjacent to said blocking rim, said head-portion flare having a trapezoidal cross section that directs flow of compressed gas toward said rim gap.

6. The compressed-gas system of claim 1, wherein said coupling body further comprises a tool port disposed on a bottom end of said coupling body, said tool port being mechanically coupled to said coupling-body threads.

7. The compressed-gas system of claim 1, wherein said coupling body comprises:
    an insertion portion comprising:
        coupling-body threads on an outer surface of said insertion portion that engage corresponding conduit threads on said conduit wall; and
        a grasping member that engages a support groove defined in said outer surface of said sealing portion of said manual-valve piston;
    an access portion comprising a tool port disposed on a bottom end of said access portion, said tool port being mechanically coupled to said coupling-body threads; and
    a coupling-body seal that seals said insertion portion and said access portion.

* * * * *